United States Patent
Ohno et al.

(10) Patent No.: US 8,048,382 B2
(45) Date of Patent: Nov. 1, 2011

(54) HONEYCOMB STRUCTURE AND EXHAUST GAS TREATING APPARATUS

(75) Inventors: Kazushige Ohno, Gifu (JP); Masafumi Kunieda, Gifu (JP); Yoshihiro Koga, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 445 days.

(21) Appl. No.: 12/271,216

(22) Filed: Nov. 14, 2008

(65) Prior Publication Data

US 2009/0246099 A1 Oct. 1, 2009

(30) Foreign Application Priority Data

Mar. 27, 2008 (WO) .................. PCT/JP2008/055974

(51) Int. Cl.
*B01D 50/00* (2006.01)

(52) U.S. Cl. ....................................................... 422/180

(58) Field of Classification Search .................. 422/177, 422/180
See application file for complete search history.

(56) References Cited

U.S. PATENT DOCUMENTS

| | | |
|---|---|---|
| 4,270,896 A | 6/1981 | Polinski et al. |
| 5,116,586 A | 5/1992 | Baacke et al. |
| 2001/0026838 A1 * | 10/2001 | Dettling et al. ............... 427/230 |
| 2001/0053340 A1 | 12/2001 | Noda et al. |
| 2004/0166035 A1 * | 8/2004 | Noda et al. .................... 422/180 |
| 2005/0256992 A1 | 11/2005 | Chalopin et al. |
| 2006/0140833 A1 | 6/2006 | Morita et al. |
| 2007/0049492 A1 | 3/2007 | Miyairi et al. |
| 2007/0092692 A1 * | 4/2007 | Masukawa et al. .......... 428/116 |
| 2007/0116870 A1 | 5/2007 | Dettling et al. |
| 2009/0246099 A1 * | 10/2009 | Ohno et al. .................... 422/181 |

FOREIGN PATENT DOCUMENTS

| | | |
|---|---|---|
| JP | 08-010566 A | 1/1996 |
| JP | 2006-183477 A | 7/2006 |
| JP | 2007-296514 A | 11/2007 |
| WO | WO 2005/063653 A1 | 7/2005 |
| WO | WO 2007/026806 A1 | 3/2007 |

* cited by examiner

*Primary Examiner* — Tom Duong
(74) *Attorney, Agent, or Firm* — Ditthavong Mori & Steiner, P.C.

(57) ABSTRACT

A honeycomb structure includes a first end face, a second end face, a honeycomb unit, and an ammonia adsorbing material. The second end face is located opposite to the first end face along a longitudinal direction of the honeycomb structure. The honeycomb unit has plural cell walls extending along the longitudinal direction from the first end face to the second end face to define plural cells. The cell walls include a NOx adsorbing material and an inorganic binder. The ammonia adsorbing material is supported on the cell walls. An amount of the ammonia adsorbing material supported on the cell walls is varied between the first end face and the second end face.

35 Claims, 6 Drawing Sheets

BACKGROUND ART

DISTANCE FROM FIRST END PORTION OF HONEYCOMB UNIT

DISTANCE FROM FIRST END PORTION OF HONEYCOMB UNIT

DISTANCE FROM FIRST END PORTION OF HONEYCOMB UNIT

DISTANCE FROM FIRST END PORTION OF HONEYCOMB UNIT

HONEYCOMB STRUCTURE AND EXHAUST GAS TREATING APPARATUS

CROSS-REFERENCE TO RELATED APPLICATIONS

The present application claims priority under 35 U.S.C. §119 to an international application PCT/JP2008/055974 filed Mar. 27, 2008, the entire contents of which are hereby incorporated by reference.

BACKGROUND OF THE INVENTION

1. Field of the Invention

The present invention relates to honeycomb structures and exhaust gas treating apparatuses.

2. Description of the Related Art

A honeycomb structure is conventionally used in exhaust gas treating apparatuses for treating NOx and the like in automobile emissions, as disclosed in Japanese Laid-Open Patent Application No. 2006-183477.

The honeycomb structure typically includes plural cells (through holes) extending in a longitudinal direction of the structure from one end surface to the other. These cells are partitioned by cell walls.

The cell walls of the honeycomb structure are typically made of ceramic, such as cordierite. On the cell walls, a NOx adsorbing material and an ammonia adsorbing material are disposed. A layer of the NOx adsorbing material, which may include ceria or the like, supports a noble metal catalyst, such as platinum. The ammonia adsorbing material may include zeolite or the like.

As automobile exhaust gases or the like pass through such a honeycomb structure, NOx in the exhaust gas is adsorbed onto the NOx adsorption layer when the exhaust gas is in an oxidative atmosphere (such as during a normal operation of a diesel engine). The adsorbed NOx is reduced on the catalyst when the exhaust gas is in a reductive atmosphere (such as in a spike period of the diesel engine) into ammonia, which is adsorbed onto the ammonia adsorption layer. When the exhaust gas returns to an oxidative atmosphere, the NOx is reduced using the ammonia. Upon running out of the adsorbed ammonia, NOx is adsorbed onto the NOx adsorption layer.

By thus passing the exhaust gas through the honeycomb structure, NOx in the exhaust gas can be treated. Meanwhile, a honeycomb structure composed of inorganic particles, inorganic fibers, and an inorganic binder is described in WO2005/063653.

The contents of the aforementioned documents Japanese Laid-Open Patent Application No. 2006-183477 and WO2005/063653 are hereby incorporated by reference herein in their entirety.

SUMMARY OF THE INVENTION

According to one aspect of the present invention, a honeycomb structure includes a first end face, a second end face, a honeycomb unit, and an ammonia adsorbing material. The second end face is located opposite to the first end face along a longitudinal direction of the honeycomb structure. The honeycomb unit has plural cell walls extending along the longitudinal direction from the first end face to the second end face to define plural cells. The cell walls include a NOx adsorbing material and an inorganic binder. The ammonia adsorbing material is supported on the cell walls. An amount of the ammonia adsorbing material supported on the cell walls is varied between the first end face and the second end face.

According to another aspect of the present invention, an exhaust gas treating apparatus for treating NOx in exhaust gas includes a honeycomb structure. The honeycomb structure includes a first end face, a second end face, a honeycomb unit, and an ammonia adsorbing material. The second end face is located opposite to the first end face along a longitudinal direction of the honeycomb structure. The honeycomb unit has plural cell walls extending along the longitudinal direction from the first end face to the second end face to define plural cells. The cell walls include a NOx adsorbing material and an inorganic binder. The ammonia adsorbing material is supported on the cell walls. An amount of the ammonia adsorbing material supported on the first end face is smaller than an amount of the ammonia adsorbing material supported on the second end face. The honeycomb structure is disposed so that the exhaust gas flows from the first end face to the second end face.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

Figure 1:
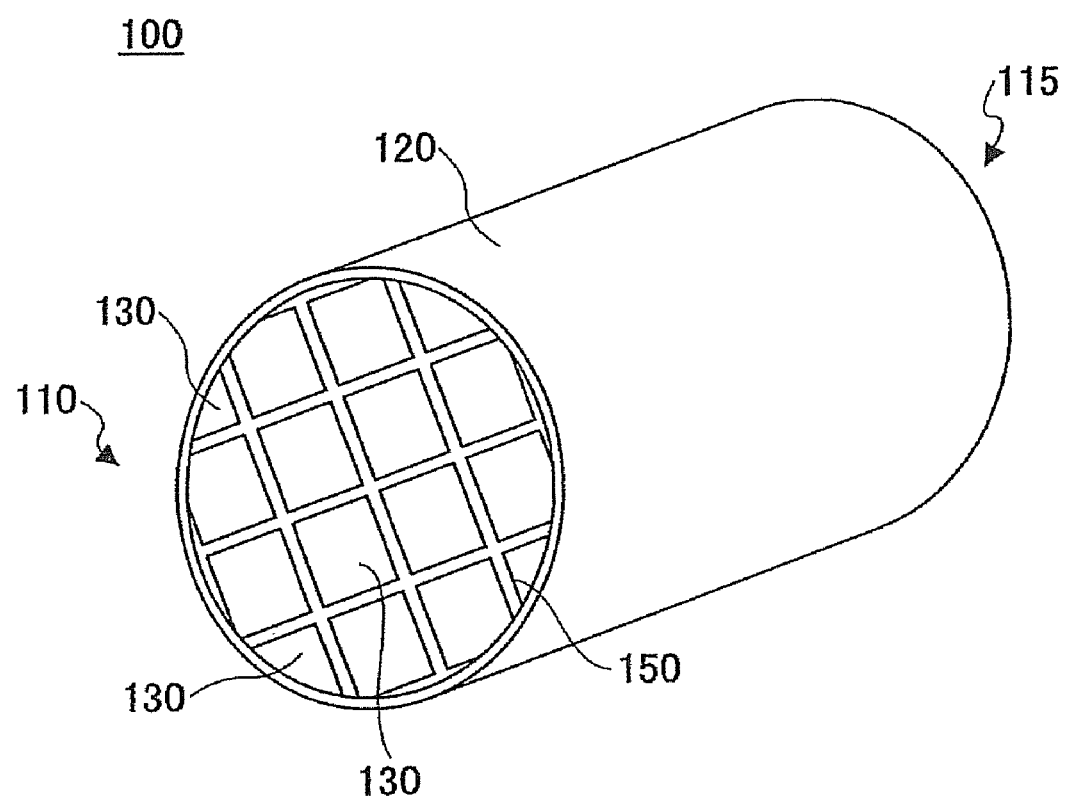
FIG. 1 is a schematic perspective view of a honeycomb structure according to an embodiment of the present invention.

The embodiments will now be described with reference to the accompanying drawings, wherein like reference numerals designate corresponding or identical elements throughout the various drawings.

Figure 2:
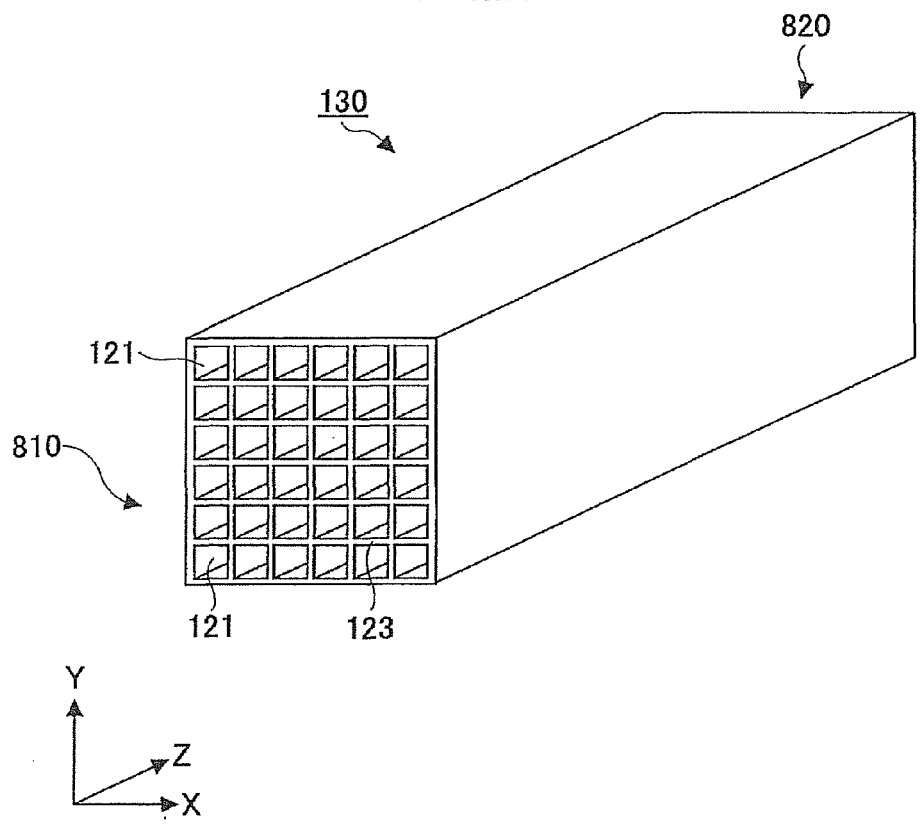
FIG. 2 is a schematic perspective view of a honeycomb unit in the honeycomb structure shown in FIG. 1.

FIG. 1 schematically shows a honeycomb structure 100 according to an embodiment of the present invention. FIG. 2 schematically shows a honeycomb unit 130 that is a basic unit of the honeycomb structure 100 of FIG. 1.

As shown in FIG. 1, the honeycomb structure 100 has two open ends 110 (first end face) and 115 (second end face). A coating layer 120 is disposed on the outer peripheral surface of the honeycomb structure 100 other than the end faces.

The honeycomb structure 100 may be constructed by joining multiple (4×4=16 in the example of FIG. 1) honeycomb units 130 shown in FIG. 2, which are columnar and made of ceramic, together by interposing adhesive layers 150, and then cutting the outer peripheral portion into a predetermined shape (which is cylindrical in the example of FIG. 1).

As shown in FIG. 2, the honeycomb unit 130 has a first end portion 810 and a second end portion 820. The honeycomb unit 130 has plural cells (through holes) 121 that extend from the first end portion 810 (first end face) to the second end portion 820 (second end face) in a longitudinal direction of the honeycomb unit 130. The cells are open-ended at each of the end portions 810 and 820 and partitioned by cell walls 123.

Hereafter, a conventional honeycomb structure is described to clarify the features of the honeycomb structure 100.

In the aforementioned honeycomb structure according to Japanese Laid-Open Patent Application No. 2006-183477, the NOx adsorbing material and the ammonia adsorbing material are disposed on the surface of the cell walls made of cordierite as a skeleton material (base material). The ammonia adsorbing material is supported on the cell walls substantially uniformly along the direction in which the cells extend.

In this honeycomb structure, the cordierite of which the skeleton (base) is made does not contribute to NOx conversion (treatment) reaction In other words, the NOx adsorbing material and the ammonia adsorbing material perform all of the reactions involved in NOx conversion. Thus, in order to improve the efficiency of NOx conversion, sufficient amounts of NOx adsorbing material and ammonia adsorbing material need to be supported on the cell walls of cordierite. For this purpose, it is necessary to increase either the thickness of the support layer, the length of the cells, or the frequency of rich spike.

However, when the thickness of the support layer is increased, the opening of the cell decreases, resulting in an increase in pressure loss during the passage of exhaust gases. When the length of the cell is increased, problems concerning installation space and weight of the cordierite honeycomb structure arise. When the frequency of rich spike is increased, fuel economy suffers.

Furthermore, in the above cycle of NOx conversion, not all of the ammonia adsorbing material is equally utilized for the ammonia adsorbing reaction. Namely, as the NOx adsorbed on the NOx adsorbing material is reduced and the produced ammonia is adsorbed onto the ammonia adsorbing material, the ammonia moves to the downstream side along with the flow of the exhaust gas. As a result, less ammonia is adsorbed on the exhaust gas inlet side than on the outlet side. In order to prevent the discharge of ammonia out of the honeycomb structure system (which may be referred to as a "slip" of ammonia), it is necessary to regain the oxidative atmosphere upon saturation in the amount of adsorbed ammonia on the exhaust gas outlet side, by increasing the frequency of rich spike. This, however, results in deterioration in fuel economy.

A honeycomb structure composed of inorganic particles, inorganic fibers, and an inorganic binder is described in WO2005/063653.

In this structure, where inorganic particles of NOx adsorbing material are used in the honeycomb structure, the problem of ammonia slip still remains even if the ammonia adsorbing material is supported on the cell walls substantially uniformly, as in Japanese Laid-Open Patent Application No. 2006-183477.

In accordance with an embodiment of the present invention, an enhanced ammonia adsorption performance can be achieved without increasing the total amount of ammonia adsorbing material supported on the cell walls.

Figure 3:
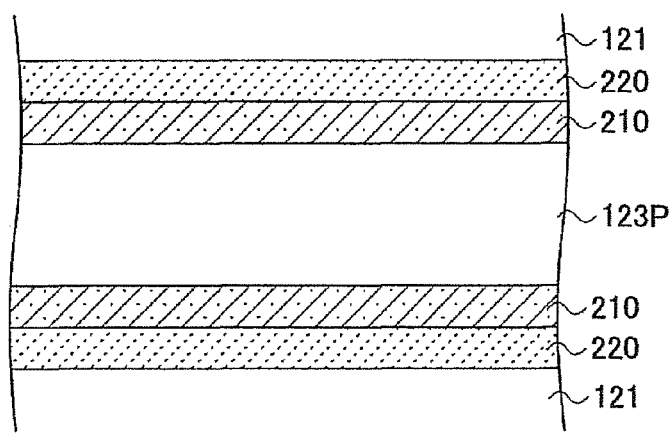
FIG. 3 is a schematic cross section of a cell wall of a conventional honeycomb structure.

FIG. 3 is an enlarged schematic cross section of a cell wall 123P of a conventional honeycomb unit 130P.

In this conventional honeycomb structure, the cell wall 123P is made of cordierite. On the cell wall 123P, a NOx adsorbing material 210 and an ammonia adsorbing material 220 are supported. The NOx adsorbing material 210 is composed of ceria and a noble metal catalyst, such as platinum. The ammonia adsorbing material 220, which is supported on the outside of the NOx adsorbing material 210, normally is composed of zeolite. It should be obvious to a person skilled in the art that in reality, each of the NOx adsorbing material 210 and the ammonia adsorbing material 220 does not form a homogeneous (continuous) "layer," as illustrated in FIG. 3, in which the layers are shown merely for ease of understanding and differs from the actual embodiment.

When the conventional honeycomb structure composed of the aforementioned materials is installed in a diesel engine exhaust gas line, the following phenomenon occurs as exhaust gases pass through the honeycomb structure.

When the exhaust gas is in an oxidative atmosphere (such as during a normal operation of a diesel engine), NOx in the exhaust gas is adsorbed onto the NOx adsorbing material 210. As the exhaust gas is rendered into a reductive atmosphere by a rich spike, HC is converted by the catalyst, and the produced $H_2$ and the NOx adsorbed on the NOx adsorbing material 210 produce ammonia through the following reaction:

$$2NO+3H_2 \rightarrow 2NH_3+O_2 \tag{1}$$

The produced ammonia is adsorbed onto the ammonia adsorbing material 220 disposed adjacent to the NOx adsorbing material 210.

When the exhaust gas is rendered back into an oxidative atmosphere (normal operation of the diesel engine), NOx in the exhaust gas is reduced by the ammonia adsorbed on the ammonia adsorbing material 220 by the following reactions:

$$4NH_3+4NO+O_2 \rightarrow 4N_2+6H_2O \tag{2-1}$$

$$8NH_3+6NO_2 \rightarrow 7N_2+12H_2O \tag{2-2}$$

As the ammonia adsorbed on the ammonia adsorbing material 220 is consumed, NOx is then adsorbed onto the NOx adsorbing material 210 again. By repeating this cycle, NOx is reduced, and the exhaust gas of which NOx has been reduced reaches the other end portion of the cells 121 and are discharged out of the honeycomb structure via its end face.

Figure 4:
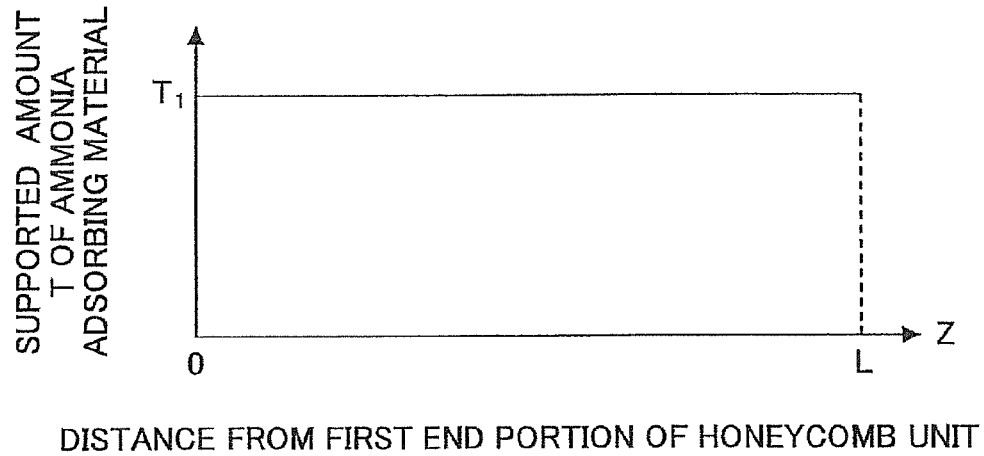
FIG. 4 shows the relationship between the distance from a first end portion of the conventional honeycomb unit and the supported amount of ammonia adsorbing material.

FIG. 4 schematically shows a relationship between the distance from the first end portion (first end face) of the honeycomb unit of the conventional honeycomb structure and the amount of ammonia adsorbing material supported on the cell walls. In FIG. 4, L is the length of the honeycomb unit. Thus, the position where Z=L corresponds to the second end portion (second end face) of the honeycomb unit. In the conventional honeycomb unit, the ammonia adsorbing material 220 is disposed on the cell wall 123P substantially uniformly in a longitudinal direction of the honeycomb unit.

In the conventional honeycomb unit, when the thickness of the support layer is increased, the opening of the cell decreases, resulting in an increase in pressure loss during the passage of exhaust gas through the cell. When the length of the cell is increased, problems in installation space and weight of the cordierite honeycomb structure arise. When the frequency of rich spike is increased, fuel economy suffers.

In the above described cycle of NOx conversion, not all of the ammonia adsorbing material is used equally for the ammonia adsorbing reaction. Namely, when the NOx adsorbed on the NOx adsorbing material is reduced and the produced ammonia is adsorbed onto the ammonia adsorbing material, the ammonia flows to the downstream side due to the flow of the exhaust gas. As a result, less ammonia is adsorbed at the exhaust gas inlet side than at the exhaust gas outlet side. In order to prevent the discharge of ammonia out of the honeycomb structure system ("slip" of ammonia), it is necessary to regain the oxidative atmosphere upon saturation in the amount of adsorbed ammonia at the exhaust gas outlet side, by increasing the frequency of rich spike. However, this results in deterioration in fuel economy.

In accordance with the present embodiment, the supported amount of ammonia adsorbing material on the cell walls is varied between the first end portion 810 and the second end portion 820 of the honeycomb unit 130.

Figure 5:
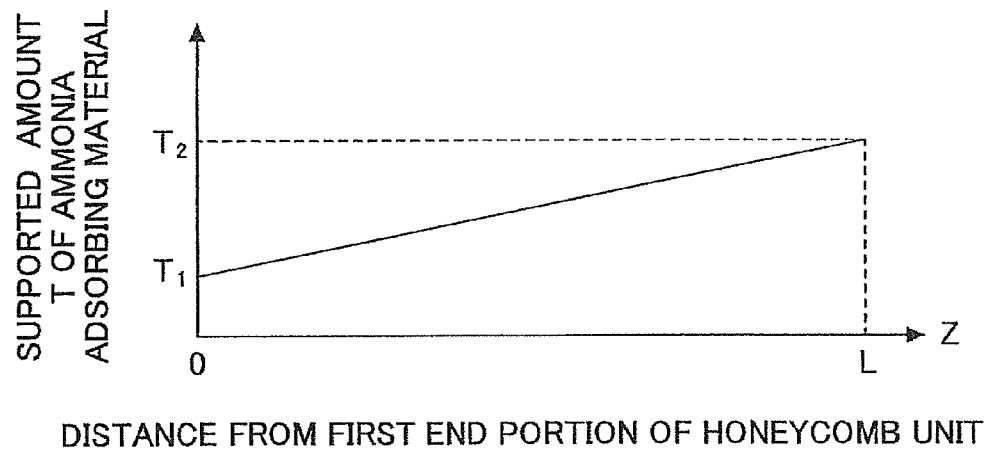
FIG. 5 shows a relationship between the distance from a first end portion of a honeycomb unit according to an embodiment of the invention and the supported amount of ammonia adsorbing material.

FIG. 5 schematically shows an example of the relationship between the distance from the first end portion 810 (first end face) of the honeycomb unit 130 in the honeycomb structure 100 according to the present embodiment of the invention, and the amount of ammonia adsorbing material supported on the cell walls. In the honeycomb structure 100, as shown in FIG. 5, the amount of ammonia adsorbing material is changed in a longitudinal direction of the honeycomb unit 130. Specifically, a supported amount T2 of the ammonia adsorbing material at the second end portion 820 (second end face) is greater than a supported amount T1 of the ammonia adsorbing material at the first end portion 810 (first end face).

Because of such a variation in the amount of ammonia adsorbing material supported in a longitudinal direction of the honeycomb unit, the honeycomb structure 100 of the present embodiment can utilize the ammonia adsorbing material more effectively for NOx treatment than possible with the conventional honeycomb structure (It is noted that, when actually performing a NOx treatment of exhaust gases using the honeycomb structure 100, the first end portion 810 (first end face) of the honeycomb unit 130 is disposed on the upstream side of the exhaust gas).

Thus, in accordance with the present embodiment, an enhanced ammonia adsorbing performance can be achieved with the same total amount of ammonia adsorbing material as used in the conventional honeycomb structure.

In the foregoing example (FIG. 5), the supported amount T of the ammonia adsorbing material increases continuously (linearly) from the value T3 at the first end portion 810 (first end face) to the value T2 at the second end portion 820 (second end face) of the honeycomb unit 130. However, the present invention is not limited to such an embodiment.

Figure 6:
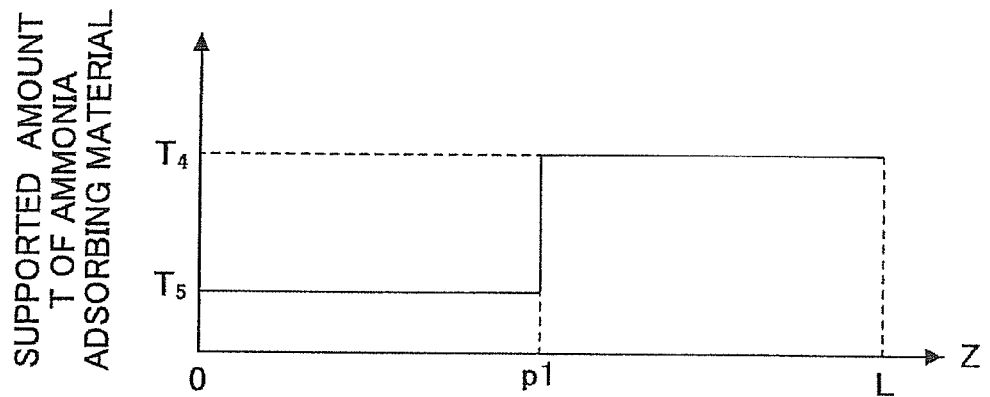
FIG. 6 shows a relationship between the distance from a first end portion of a honeycomb unit according to another embodiment of the invention and the supported amount of ammonia adsorbing material.
Figure 7:
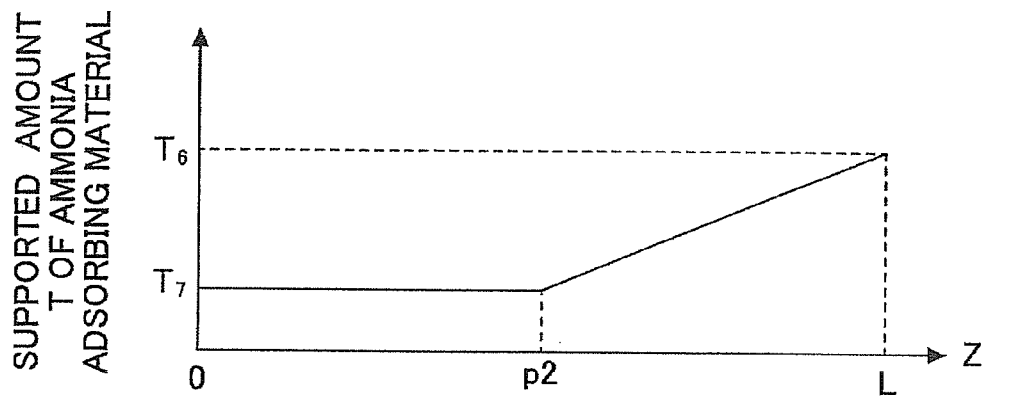
FIG. 7 shows a relationship between the distance from a first end portion of a honeycomb unit according to another embodiment of the invention and the supported amount of ammonia adsorbing material.

FIGS. 6 and 7 show other examples of the way the supported amount T of the ammonia adsorbing material is varied in a longitudinal direction of the honeycomb unit.

In the example shown in FIG. 6, the supported amount T of ammonia adsorbing material is T5 in a region from the first end portion 810 (first end face) of the honeycomb unit to a position at a distance p1. In a region from the position p1 to the second end portion 820 (second end face), the supported amount T of ammonia adsorbing material is T4 (T5<T4).

In the example shown in FIG. 7, the supported amount T of ammonia adsorbing material is constant at T7 in a region between the first end portion 810 (first end face) to a position P2, while the supported amount T of ammonia adsorbing material increases gradually from T7 to T6 in a region from p2 to the second end portion 820 (second end face).

The aforementioned advantageous effect of the foregoing embodiment can also be obtained when the supported amount of the ammonia adsorbing material is varied in a longitudinal direction of the honeycomb unit in these ways.

In the examples shown in FIGS. 6 and 7, the position p may take basically any value as long as 0<(p1, p2)<L.

Preferably, the supported amount of ammonia adsorbing material at the second end portion of the honeycomb unit is about 1.2 to about 5 times the supported amount of ammonia adsorbing material at the first end portion of the honeycomb unit. When the difference is about 1.2 times or more, an increase in the amount of catalyst needed compared with the conventional art can be prevented. When the difference is about 5 times or less, a sufficient amount of catalyst can be more readily obtained at the first end portion, and a sufficient treatment can be more readily performed.

The supported amount of ammonia adsorbing material at each of the end portions of the honeycomb unit may be determined at a position 10 mm from either end face using an ICP optical emission spectrometer (such as ICPS-8100 from Shimadzu Corporation for elemental analysis).

The supported amount of ammonia adsorbing material T may increase from the first end portion 810 (first end face) to the second end portion 820 (second end face) of the honeycomb unit in plural steps. Further, rather than linearly as shown in FIG. 5 (0<Z<L) and in the region where p2<Z<L in FIG. 7, the supported amount may increase non-linearly.

Specifically, the supported amount of ammonia adsorbing material may vary in any way in a longitudinal direction of the honeycomb unit as long as the supported amount is greater at the second end portion 820 than at the first end portion 810.

In accordance with the foregoing embodiment of the present invention, the cell walls are made of a material including mainly a NOx adsorbing material, such as ceria. Ammonia adsorbing material such as zeolite is supported on the cell walls.

Preferably, a noble metal catalyst is supported on the cell walls. Examples of the noble metal catalyst are platinum, palladium, and rhodium. The NOx adsorbing material may be zeolite ion-exchanged with Fe, Cu, Ni, Zn, Mn, or Co. Examples of zeolite are zeolite β, zeolite Y, ferrierite, ZSM-5, mordenite, faujasite, zeolite A, zeolite L, or the like.

The honeycomb unit 130 includes an inorganic binder as well as the inorganic particles including the NOx adsorbing material such as ceria. The honeycomb unit may further include inorganic fibers.

Examples of the inorganic binder are an inorganic sol, a clay-based binder or the like. Examples of the inorganic sol are alumina sol, silica sol, titania sol, liquid glass, or the like. Examples of the clay-based binder are white clay, kaolin, montmorillonite, sepiolite, and attapulgite, which is a branched-chain structure clay. These may be used individually or in combination.

Among those mentioned above, at least one kind selected from a group consisting of alumina sol, silica sol, titania sol, liquid glass, sepiolite, and attapulgite is desirable.

When an inorganic fiber is added to the honeycomb unit, the inorganic fiber material is desirably alumina, silica, silicon carbide, silica alumina, glass, potassium titanate, or aluminum borate, or the like. These may be used individually or in combination. Among the materials mentioned above, alumina is desirable.

A desirable lower limit of the total amount of inorganic particles contained in the honeycomb unit is 30 wt %, a more desirable lower limit is 40 wt %, and an even more desirable lower limit is 50 wt %. A desirable upper limit is 90 wt %, a more desirable upper limit is 80 wt %, and an even more desirable upper limit is 75 wt %. When the total amount of the particles is about 30 wt % or more, a relatively large amount of the particles that contribute to NOx conversion can be more readily obtained, so that deterioration in NOx conversion performance can be avoided. When the total amount is about 90 wt % or less, deterioration in the strength of the honeycomb unit can be more readily prevented.

Preferably, a solid content of the inorganic binder is about 5 wt % or more, more preferably about 10 wt % or more, and even more preferably about 15 wt % or more. The solid content of the inorganic binder is preferably about 50 wt % or less, more preferably about 40 wt % or less, and even more preferably about 35 wt % or less. When the amount of solid content of the inorganic binder is about 5 wt % or more, a decrease in the strength of a manufactured honeycomb unit can be more readily prevented. When the amount of solid content of the inorganic binder is about 50 wt % or less, deterioration in the moldability of the raw material composition can be more readily prevented.

When an inorganic fiber is contained in the honeycomb unit, a desirable lower limit of the total amount of the inorganic fiber is about 3 wt %, a more desirable lower limit is about 5 wt %, and an even more desirable lower limit is about 8 wt %. A desirable upper limit of the total amount of the inorganic fiber is about 50 wt %, a more desirable upper limit is about 40 wt %, and an even more desirable upper limit is about 30 wt %. When the content of the inorganic fiber is about 3 wt % or more, a sufficient contribution to the strength of the honeycomb unit can be more readily obtained. When the content is about 50 wt % or less, a relatively large amount of the inorganic particles that contribute to NOx conversion can be more readily obtained, so that a decrease in NOx conversion performance can be more readily prevented.

The cross-sectional shape of the honeycomb unit 130 taken perpendicular to a longitudinal direction is not particularly limited and may have any shape as long as the honeycomb units 130 can be joined to one another by interposing the adhesive layer. For example, the cross-sectional shape of the honeycomb unit 130 may be square, rectangular, hexagonal, sectoral, or the like.

The cross-sectional shape of each of the cells 121 of the honeycomb unit 130 perpendicular to a longitudinal direction is not particularly limited and may be triangular or polygonal, as well as square.

The cell density of the honeycomb unit 130 is preferably in the range of from about 15.5 to about 186 cells/cm$^2$ (about 100 to about 1200 cells per square inch (cpsi)), more preferably in the range of from about 46.5 to about 170 cells/cm$^2$ (about 300 to about 1100 cpsi), and even more preferably in the range of from about 62.0 to about 155 cells/cm$^2$ (about 400 to about 1000 cpsi).

The thickness of the cell wall 123 of the honeycomb unit 130 is not particularly limited. From the viewpoint of strength, a desirable lower limit of the thickness is about 0.1 mm and a desirable upper limit is about 0.4 mm.

The shape of the honeycomb structure 100 is not particularly limited and may be cylindroid, square-pillar, polygonal-pillar, or the like, as well as cylindrical as shown in FIG. 1.

The coating layer 120 of the honeycomb structure 100 is made of a raw material paste (coating layer paste) containing inorganic particles, inorganic fibers, an inorganic binder, and an organic binder. The inorganic particles may be particles of alumina, silica, zirconia, titania, ceria, mullite, zeolite, or the like. These particles may be used individually or in combination. The inorganic fiber and the inorganic binder may be those mentioned above. Examples of the organic binder are polyvinyl alcohol, methylcellulose, ethylcellulose, carboxylmethylcellulose, or the like. These may be used individually or in combination in a mixture. Particularly, carboxylmethylcellulose is desirable as the organic binder.

The coating layer 120 may be formed by placing the coating layer paste on the outer peripheral surface of the honeycomb structure 100 and then drying it. To the raw material paste, there may be added a pore-forming agent such as a balloon that is a micro hollow sphere of an oxide-based ceramic, a spherical acrylic particle, graphite, or the like. The thickness of the coating layer 120 is preferably about 0.1 mm to about 2.0 mm.

In the honeycomb structure 100 of the present embodiment, the adhesive layer 150 is made of the same material as that of the coating layer 120. However, the adhesive layer 150 may be made of a material different from that of the coating layer 120.

Figure 8:
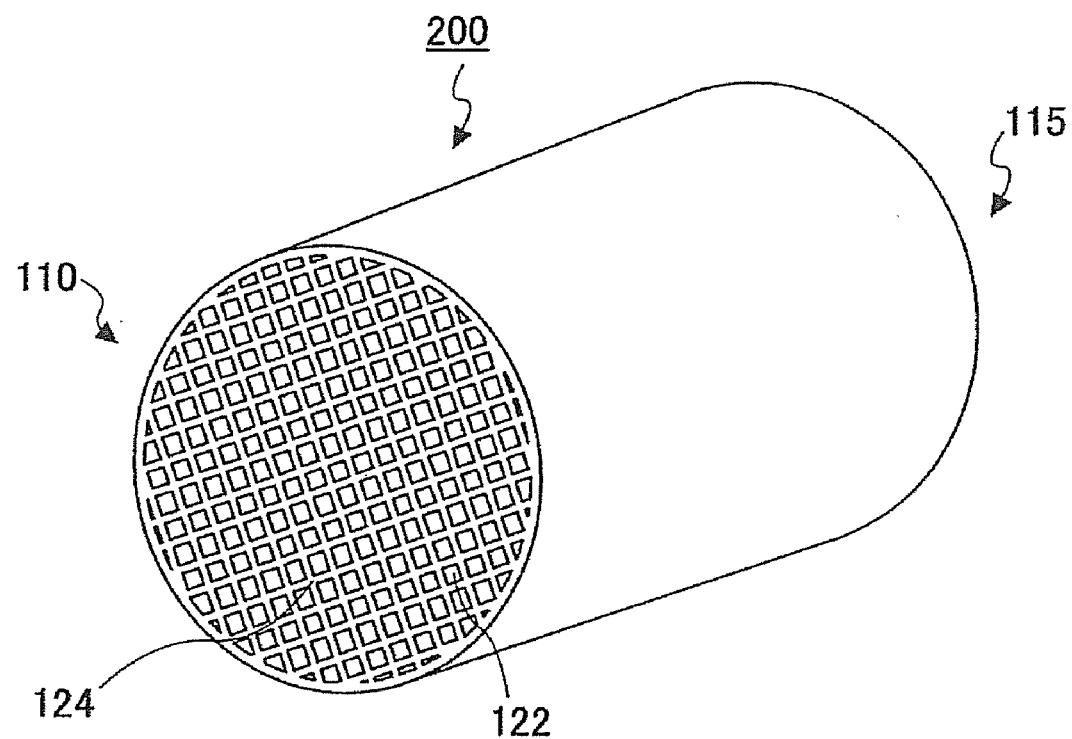
FIG. 8 is a schematic perspective view of a honeycomb structure according to another embodiment of the present invention.

FIG. 8 shows a honeycomb structure 200 according to another embodiment of the invention. The honeycomb structure 200 is similar to the honeycomb structure 100 with the exception that the structure 200 includes a single honeycomb unit in which plural cells 122 partitioned by cell walls 124 are arranged in parallel in a longitudinal direction of the structure. On the outer peripheral surface of the honeycomb structure 200, a coating layer may or may not be disposed.

The honeycomb structures 100 and 200 may be used in an apparatus for treating exhaust gases emitted by a diesel engine. In this case, the honeycomb structure is used with its end surface having less amount of ammonia adsorbing material on the cell walls disposed on the exhaust gas inlet side of the apparatus.

In accordance with the present embodiment of the invention, an enhanced ammonia adsorption performance can be achieved without increasing the total amount of ammonia adsorbing material supported on the cell walls.

Process of Manufacturing a Honeycomb Structure

In the following, a process of manufacturing a honeycomb structure according to an embodiment of the invention is described.

First, a honeycomb unit molded body is manufactured by extrusion molding or the like, for example, of a raw material paste including mainly inorganic particles and an inorganic binder, to which an inorganic fiber may be added as needed. The inorganic particles mainly include ceria particles (NOx adsorbing material); they may further include zeolite particles (ammonia adsorbing material).

In addition, an organic binder, a dispersion medium, and/or a molding aid may be added to the raw material paste as needed in view of moldability. The organic binder is not particularly limited and there may be used one or more kinds of organic binders selected from methylcellulose, carboxymethylcellulose, hydroxyethyl cellulose, polyethyleneglycol, phenol resin, and epoxy resin. Preferably, the content of the organic binder is in the range of from about 1 to about 10 parts by weight with respect to a total of 100 parts by weight of the inorganic particles, inorganic binder, and inorganic fiber.

The dispersion medium is not particularly limited and may be water, an organic solvent (such as benzene), alcohol (such as methanol) or the like. The molding aid is not particularly limited and may be ethylene glycol, dextrin, aliphatic acid, aliphatic acid soap, polyalcohol, or the like.

The raw material paste is not particularly limited. Preferably, it is mixed or kneaded using a mixer, an attritor or the like, for example. It may also be sufficiently kneaded in a kneader or the like. The method of molding the raw material paste is not particularly limited. Preferably, however, the raw material paste is molded into a shape having the cells by extrusion molding.

Preferably, the resultant molded body is dried using a drying apparatus which is not particularly limited and may be a microwave drying apparatus, a hot air drying apparatus, a dielectric drying apparatus, a reduced-pressure drying apparatus, a vacuum drying apparatus, a freeze drying apparatus, or the like. Preferably, the resultant molded body is degreased under degreasing conditions that are not particularly limited and may be appropriately selected depending on the kind or amount of organic matter contained in the molded body. Preferable conditions are the temperature of about 400° C. and the duration of about two hours. Furthermore, the resultant molded body is preferably fired under firing conditions that are not particularly limited and may include the temperature in the range of preferably from about 600 to about 1200° C. and more preferably from about 600 to about 1000° C. These ranges are preferable because when the firing temperature is about 600° C. or higher, for example, sintering can proceed more smoothly, so that a sufficient strength of the honeycomb unit can be more readily obtained. When the temperature is about 1200° C. or lower, excessive sintering can be avoided, so that a sufficient specific surface area per unit volume of the honeycomb unit can be more readily obtained.

In the next step, a noble metal catalyst is supported on the cell walls of the resultant honeycomb unit. The noble metal catalyst that is supported is not particularly limited and may be platinum, palladium, rhodium or the like. The noble metal catalyst may be supported on the cell walls by immersing the honeycomb unit in a nitric acid solution containing platinum ion.

Then, an ammonia adsorbing material is supported on the cell walls of the honeycomb unit. The ammonia adsorbing material, which may be zeolite, may be supported on each cell wall by immersing the honeycomb unit in a solution containing the ammonia adsorbing material.

In order to change the supported amount of ammonia adsorbing material in a longitudinal direction of the honeycomb unit in accordance with the present embodiment, the ammonia adsorbing material is supported on the cell walls by the following process.

While FIGS. 9A through 9D show a cylindrical honeycomb unit (an evaluation sample), the honeycomb unit may have a square-pillar shape or may be a honeycomb structure.

Figure 9A:
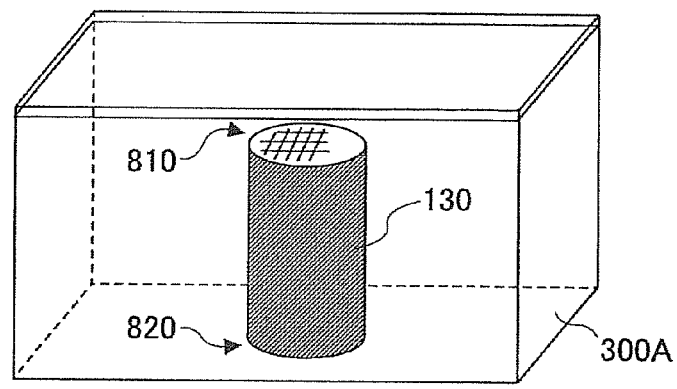
FIG. 9A illustrates a step in a process of manufacturing a honeycomb structure.

(Step 1) As shown in FIG. 9A, the entire honeycomb unit 130 from the first end portion 810 (first end face) to the second end portion 820 (second end face) is immersed in a bath 300A holding a first impregnation solution for a predetermined duration of time in order to cause the ammonia adsorbing material to be supported on all regions of the honeycomb unit 130.

Figure 9B:
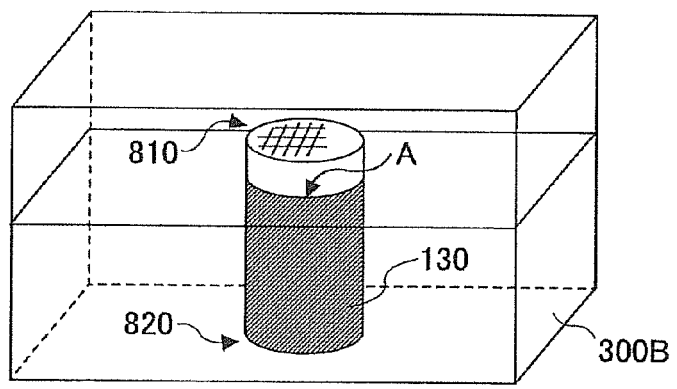
FIG. 9B illustrates another step in the process of manufacturing a honeycomb structure.

(Step 2) Then, as shown in FIG. 9B, the honeycomb unit 130 except for its portion from the first end portion 810 (first end face) to a predetermined distance A along its length is immersed in a bath 300B holding a second impregnation solution for a predetermined time, in order to cause the ammonia adsorbing material to be supported on the immersed regions. As a result, there are obtained two regions with different supported amounts of ammonia adsorbing material; namely, a first region $R_1$ (extending from the first end portion (first end face) to position A) and a second region $R_2$ to $R_5$ (the regions between position A to the second end portion) (second end face).

Figure 9C:
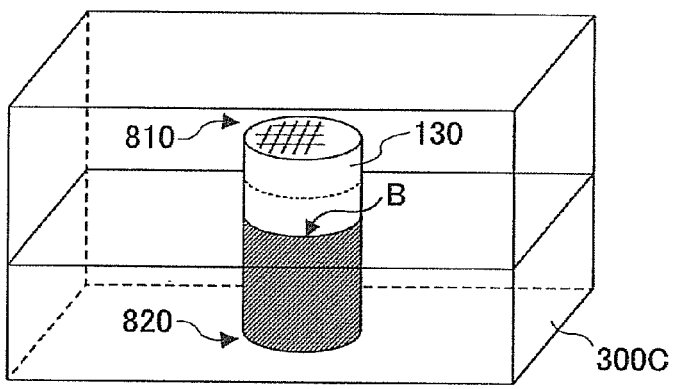
FIG. 9C illustrates another step in the process of manufacturing a honeycomb structure.

(Step 3) In the next step, as shown in FIG. 9C, the honeycomb unit 130 except for its portion extending from the first end portion 810 (first end face) to a predetermined distance B in a longitudinal direction, is immersed in a bath 300C holding a third impregnation solution for a predetermined time, in order to cause the ammonia adsorbing material to be supported on the immersed regions. As a result, there are obtained three regions with different supported amounts of ammonia adsorbing material; namely, a first region $R_1$ (extending from the first end portion (first end face) to position A), a second region $R_2$ (region between position A to position B), and a third region $R_3$ to $R_5$ (regions between position B and the second end portion (second end face)).

Figure 9D:
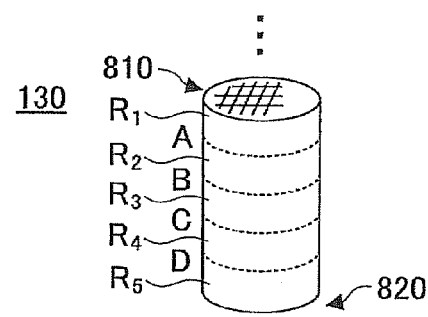
FIG. 9D illustrates a completed honeycomb structure in which the amount of ammonia adsorbing material varies in the longitudinal direction.

(Step 4) By repeating similar steps, there can be obtained plural regions each having a predetermined supported amount of ammonia adsorbing material; namely, the first region $R_1$ (extending from the first end portion (first end face) to position A); the second region $R_2$ (between positions A and B); a third region $R_3$ (between positions B and C); a fourth region $R_4$ (between positions C and D); and an n-th region $R_n$. In this way, a honeycomb unit in which the supported amount of ammonia adsorbing material varies from the first end portion 810 (first end face) to the second end portion 820 (second end face) can be readily manufactured (FIG. 9D).

It should be obvious that a honeycomb unit in which the supported amount of ammonia adsorbing material changes more continuously along the longitudinal direction can be readily manufactured by using shorter intervals between the positions A and D in the above described process. A portion of the honeycomb unit between the first end portion 810 to a predetermined position may be not immersed in any impregnation solution at all. In this case, a honeycomb unit can be manufactured in which T1=0 in the vicinity of the first end portion 810 (first end face) in the embodiment shown in FIG. 6 or FIG. 7.

In the above steps, plural impregnation solutions with different concentrations of ammonia adsorbing material are prepared in advance, and the depth of immersion of the honeycomb unit in each of the impregnation solutions is changed. Thus, the honeycomb unit can be manufactured in which the supported amount of ammonia adsorbing material on the cell walls is varied along the distance from the first end portion 810 (first end face) to the second end portion 820 (second end face). Alternatively, the depth of immersion of the honeycomb unit in a single impregnation solution may be gradually changed to manufacture a honeycomb unit in which the supported amount of ammonia adsorbing material on the cell walls varies along the distance from the first end portion 810 (first end face) to the second end portion 820 (second end face).

The ammonia adsorbing material may be supported not in the above step but in another step, such as in the honeycomb unit step, a step in which plural honeycomb units are joined, or a step in which the outer peripheral portion is cut.

Thereafter, on the lateral surfaces of the resultant honeycomb unit, an adhesive layer paste is applied to a uniform thickness. Other honeycomb units are laminated successively by interposing the adhesive layer. By repeating such steps, a honeycomb structure with desired dimensions (such as including four honeycomb units both vertically and horizontally) may be manufactured. The adhesive layer paste may include the aforementioned raw material paste.

The adhesive layer paste is not particularly limited and may include a mixture of an inorganic binder and inorganic particles, a mixture of an inorganic binder and inorganic fibers, or a mixture of an inorganic binder, inorganic particles, and inorganic fibers, or the like. To such a mixture, an organic binder may be further added. The organic binder is not particularly limited and may include one or more kinds selected from polyvinyl alcohol, methylcellulose, ethylcellulose, and carboxymethylcellulose and the like.

The thickness of the adhesive layer for joining the honeycomb units is preferably about 0.3 to about 2 mm. When the thickness of the adhesive layer is about 0.3 mm or more, a sufficient bonding strength can be more readily obtained. When the thickness of the adhesive layer is about 2 mm or less, pressure loss can be more readily avoided. The number of the honeycomb units that are joined is appropriately selected depending on the required size of the honeycomb structure.

The honeycomb structure is then heated to dry and solidify the adhesive layer paste in order to form an adhesive layer and bind the honeycomb units together.

Then, the honeycomb structure is cut into, e.g., a cylindrical shape using a diamond cutter, for example, in order to obtain a honeycomb structure with a required outer shape.

The outer peripheral surface (lateral surface) of the honeycomb structure is then coated with a coating layer paste, which is dried and solidified into a coating layer. The coating layer paste is not particularly limited and may be the same as or different from the paste for the adhesive layer. The composition of the coating layer paste may be the same as or different from the composition of the adhesive layer paste. The thickness of the coating layer is not particularly limited.

After plural honeycomb units are joined by interposing the adhesive layer (and after the formation of the coating layer when one is provided), the honeycomb structure is preferably heat-processed. By a heating process, any organic binder that may be contained in the adhesive layer paste and/or the coating layer paste can be degreased. The degreasing conditions may be appropriately selected depending on the kind or amount of organic matter contained. Normally, the degreasing conditions may include the temperature of about 700° C. and the duration of about two hours.

Through the above steps, the honeycomb structure with the shape shown in FIG. 1 can be manufactured.

Exhaust Gas Treating Apparatus

In the following, an exhaust gas treating apparatus according to an embodiment of the invention is described.

The exhaust gas treating apparatus according to the present embodiment includes the above-described honeycomb structure housed in a metal container (shell) which is disposed in an exhaust gas passage.

Between the honeycomb structure and the metal container, there is disposed a holding/sealing member in such a manner as to cover a lateral surface of the honeycomb structure. The holding/sealing member is mainly composed of inorganic fibers.

In the exhaust gas treating apparatus of the present embodiment, the honeycomb structure is disposed with its end portion having less ammonia adsorbing material disposed on the upstream side of the exhaust gas passage.

Because the honeycomb structure is thus disposed within the exhaust gas treating apparatus, an exhaust gas treating apparatus can be obtained in which there is no increase in the total amount of ammonia adsorbing material supported on the cell walls and in which the discharge of ammonia out of the honeycomb structure system is prevented.

EXAMPLES

In the following, examples are described.

Example 1

2180 parts by weight of ceria particles (average particle size 2 μm), 500 parts by weight of alumina particles (average particle size 2 μm), 345 parts by weight of alumina fiber (average fiber diameter 6 μm; average fiber length 100 μm), and 2200 parts by weight of alumina sol (solid content 30 wt %) were mixed. To the resultant mixture, there were added 320 parts by weight of methylcellulose as an organic binder, and small amounts of a plasticizer, a surfactant, and a lubricant. The mixture was further mixed and kneaded, obtaining a mixture composition. The mixture composition was then extrusion-molded using an extruder, thereby obtaining a raw molded body.

After sufficiently drying with a microwave drying apparatus and a hot air drying apparatus, the raw molded body was maintained at 400° C. for two hours for degreasing. Thereafter, firing was performed at 700° C. for two hours, obtaining a square-pillar shaped porous honeycomb unit (with dimensions of 35 mm in height×35 mm in width×150 mm in length). The cell density of the porous honeycomb unit was 93 cells/cm$^2$, and the cell wall thickness was 0.2 mm.

The square-pillar shaped porous honeycomb unit was then cut using a diamond cutter in the axial direction and a direction perpendicular to the axis. A further cutting process was performed, obtaining a cylindrical porous honeycomb unit (with dimensions of 25 mm in diameter×60 mm in length) as an evaluation sample.

After dipping in a platinum nitric acid solution, the honeycomb unit was heated at 600° C. for one hour to cause the platinum to be supported on the cell walls. The weight of platinum per unit volume of the cylindrical honeycomb unit was 3 g/L.

Thereafter, an impregnation process was performed as described with reference to FIGS. 9A through 9D, thereby causing zeolite to be supported on the cell walls of the cylindrical honeycomb unit. For the impregnation solution, two kinds of solutions with different zeolite concentrations were used. First, the entire honeycomb unit (evaluation sample) was immersed in the impregnation solution with a predetermined zeolite concentration. Then, a region of the honeycomb unit (evaluation sample) from the second end face to a distance of 30 mm (regions $R_4$-$R_6$ in Table 1) was immersed in the impregnation solution with another zeolite concentration. The honeycomb unit eventually had two groups of support regions (regions $R_1$-$R_3$ and regions $R_4$-$R_6$). The position of each region and the zeolite supported amount in each region are shown in Table 1.

TABLE 1

| | Zeolite supported amount (g/L) | | | | | | Ammonia |
|---|---|---|---|---|---|---|---|
| | $R_1$ | $R_2$ | $R_3$ | $R_4$ | $R_5$ | $R_6$ | detected |
| Ex. 1 | 78 | 78 | 78 | 122 | 122 | 122 | No |
| Ex. 2 | 87 | 87 | 87 | 113 | 113 | 113 | No |
| Ex. 3 | 85 | 85 | 100 | 100 | 115 | 115 | No |
| Ex. 4 | 65 | 65 | 85 | 115 | 135 | 135 | No |
| Ex. 5 | 50 | 70 | 90 | 110 | 130 | 150 | No |
| Comp. Ex. 1 | 100 | 100 | 100 | 100 | 100 | 100 | Yes |

$R_1$: First end face to 10 mm
$R_2$: 10 mm to 20 mm
$R_3$: 20 mm to 30 mm
$R_4$: 30 mm to 40 mm
$R_5$: 40 mm to 50 mm
$R_6$: 50 mm to second end face Example 2

A honeycomb unit (evaluation sample) according to Example 2 was manufactured in the same process as for Example 1 with the exception that impregnation solutions with two concentrations different from the concentrations of the impregnation solutions for Example 1 were used. The position of each region and the zeolite supported amount in each region are shown in Table 1.

Example 3

A honeycomb unit (evaluation sample) according to Example 3 was manufactured in the same process as for Example 1 with the exception that three different concentrations of impregnation solutions were used. The position of each region and the zeolite supported amount in each region are shown in Table 1.

Example 4

A honeycomb unit (evaluation sample) according to Example 4 was manufactured in the same process as for Example 1 with the exception that four different concentrations of impregnation solutions were used. The position of each region and the zeolite supported amount in each region are shown in Table 1.

Example 5

A honeycomb unit (evaluation sample) according to Example 5 was manufactured in the same process as for Example 1 with the exception that six different concentrations of impregnation solutions were used. The position of each region and the zeolite supported amount in each region are shown in Table 1.

Comparative Example 1

A honeycomb unit (evaluation sample) according to Comparative Example 1 was manufactured in the same process as for Example 1 with the exception that a single kind of impregnation solution was used, and the entire honeycomb unit (evaluation sample) was immersed in the single impregnation solution. The zeolite supported amount in each region is shown in Table 1.

Evaluation of NOx Treatment Performance

NOx treatment performance of each of the honeycomb units (evaluation samples) according to Examples 1 through 5 and Comparative Example 1 was evaluated by causing a mixture gas imitating the operating conditions of an automobile diesel engine during lean and rich spikes to flow through the honeycomb units, and measuring the amount of NO (nitric oxide) in the gas discharged from the honeycomb structure. During measurement of each honeycomb unit, the end portion (end face) side of the honeycomb unit where the zeolite supported amount was smaller was disposed on the exhaust gas inlet side.

Table 2 shows the composition of each gas during the lean operation and the rich spike operation. During the test, a cycle of introducing the lean gas into the first end portion of the honeycomb unit (evaluation sample) for 55 seconds and then introducing the rich gas for five seconds was repeated until the NO concentration in the exhaust gas fluctuated little.

TABLE 2

| Gas component | Gas concentration | |
| --- | --- | --- |
| | Lean | Rich spike |
| $CO_2$ | 6 vol % | 6 vol % |
| $O_2$ | 6 vol % | — |
| NO | 110 ppm | 110 ppm |
| CO | 500 ppm | 2% |
| THC (hydrocarbon) | 900 ppm* | 900 ppm* |
| $H_2O$ | 7 vol % | 7 vol % |
| $N_2$ | Balance | Balance |
| SV | 50,000/hr | 47,000/hr |

*Standardized amount of carbon

For the measurement of NO concentration, the MEXA-7100D exhaust gas analyzer from HORIBA, Ltd. was used. The NO detection limit of this apparatus is 0.1 ppm.

The test temperature (honeycomb unit and gas temperatures) was maintained at 300° C. throughout the test period.

For the evaluation of NOx treatment performance, a NOx conversion rate N was used. NOx conversion rate N was calculated as follows:

$$N(\%) = \frac{NO(A) - NO(B)}{NO(A)} \times 100 \qquad (3)$$

where NO(A) is the NO concentration in the mixture gas before being introduced into the honeycomb unit, and NO(B) is the NO concentration in the exhaust gas emitted by the honeycomb unit.

The evaluation showed that the NOx conversion rate N exceeded 80% in all of the honeycomb units (evaluation samples) according to Examples 1 through 5.

Together with the evaluation of NOx treatment performance, the amount of ammonia in the gas emitted by the honeycomb unit (evaluation sample) was measured. For the measurement of the ammonia amount, an ammonia detector (MEXA-1170NX from HORIBA, Ltd.) with a measurement limit of 0.1 ppm was used.

The result is shown in the right-end column in Table 1. As shown, while ammonia was detected in the exhaust gas from the honeycomb unit (evaluation sample) according to Comparative Example 1, no ammonia was detected in the exhaust gas from any of the honeycomb units (evaluation samples) according to Examples 1 through 5.

Thus, in the honeycomb structure according to the present embodiment, improved NOx treatment performance was achieved with no leakage of ammonia, thus exhibiting good characteristics.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A honeycomb structure comprising:
a first end face;
a second end face located opposite to the first end face along a longitudinal direction of the honeycomb structure;
a honeycomb unit having plural cell walls extending along the longitudinal direction from the first end face to the second end face to define plural cells, the cell walls including a NOx adsorbing material and an inorganic binder; and an ammonia adsorbing material supported on the cell walls, an amount of the ammonia adsorbing material supported on the first end face being smaller than an amount of the ammonia adsorbing material supported on the second end face, the honeycomb structure being disposed so that exhaust gas flows from the first end face to the second end face.

2. The honeycomb structure according to claim 1, wherein the amount of the ammonia adsorbing material increases from the first end face toward the second end face.

3. The honeycomb structure according to claim 2, wherein the amount of the ammonia adsorbing material increases linearly or in steps.

4. The honeycomb structure according to claim 1, wherein the amount of the ammonia adsorbing material supported at the second end face is about 1.2 to about 5 times the amount of the ammonia adsorbing material supported at the first end face.

5. The honeycomb structure according to claim 1, wherein the NOx adsorbing material includes ceria, and the ammonia adsorbing material includes zeolite.

6. The honeycomb structure according to claim 5, wherein the zeolite comprises at least one of zeolite .beta., zeolite Y, ferrierite, ZSM-5, mordenite, faujasite, zeolite A, and zeolite L.

7. The honeycomb structure according to claim 1, further comprising:
a noble metal catalyst supported on the cell walls.

8. The honeycomb structure according to claim 7, wherein the noble metal catalyst comprises at least one of platinum, palladium, and rhodium.

9. The honeycomb structure according to claim 1, wherein the inorganic binder comprises at least one of alumina sol, silica sol, titania sol, liquid glass, sepiolite, and attapulgite.

10. The honeycomb structure according to claim 1, wherein the honeycomb unit further includes an inorganic fiber.

11. The honeycomb structure according to claim 10, wherein the inorganic fiber comprises at least one of alumina, silica, silicon carbide, silica alumina, glass, potassium titanate, and aluminum borate.

12. The honeycomb structure according to claim 9, wherein a content of the inorganic fiber is in a range of from about 3 wt % to about 50 wt %.

13. The honeycomb structure according to claim 1, wherein the ammonia adsorbing material comprises zeolite ion-exchanged with Fe, Cu, Ni, Zn, Mn, or Co.

14. The honeycomb structure according to claim 1, wherein a total amount of inorganic particles which are contained in the honeycomb unit and which include the NOx adsorbing material is in a range of from about 30 wt % to about 90 wt %.

15. The honeycomb structure according to claim 1, wherein a solid content of the inorganic binder is in a range of from about 5 wt % to about 50 wt %.

16. The honeycomb structure according to claim 1, comprising:
plural pillar honeycomb units; and
an adhesive layer which connects the honeycomb units.

17. The honeycomb structure according to claim 1, comprising a single honeycomb unit.

18. An exhaust gas treating apparatus for treating NOx in exhaust gas, comprising:
a honeycomb structure comprising:
a first end face;
a second end face located opposite to the first end face along a longitudinal direction of the honeycomb structure;
a honeycomb unit having plural cell walls extending along the longitudinal direction from the first end face to the second end face to define plural cells, the cell walls including a NOx adsorbing material and an inorganic binder; and
an ammonia adsorbing material supported on the cell walls, an amount of the ammonia adsorbing material supported on the first end face being smaller than an amount of the ammonia adsorbing material supported on the second end face, the honeycomb structure being disposed so that the exhaust gas flows from the first end face to the second end face.

19. The exhaust gas treating apparatus according to claim 18, further comprising:
a metal container in which the honeycomb structure is disposed; and
a holding/sealing member disposed between the honeycomb structure and the metal container to cover a lateral surface of the honeycomb structure.

20. The exhaust gas treating apparatus according to claim 18, wherein the amount of the ammonia adsorbing material increases from the first end face toward the second end face.

21. The exhaust gas treating apparatus according to claim 20, wherein the amount of the ammonia adsorbing material increases linearly or in steps.

22. The exhaust gas treating apparatus according to claim 18, wherein the amount of the ammonia adsorbing material supported at the second end face is about 1.2 to about 5 times the amount of the ammonia adsorbing material supported at the first end face.

23. The exhaust gas treating apparatus according to claim 18, wherein the NOx adsorbing material includes ceria, and the ammonia adsorbing material includes zeolite.

24. The exhaust gas treating apparatus according to claim 23, wherein the zeolite comprises at least one of zeolite .beta., zeolite Y, ferrierite, ZSM-5, mordenite, faujasite, zeolite A, and zeolite L.

25. The exhaust gas treating apparatus according to claim 18, further comprising:
a noble metal catalyst supported on the cell walls.

26. The exhaust gas treating apparatus according to claim 25, wherein the noble metal catalyst comprises at least one of platinum, palladium, and rhodium.

27. The exhaust gas treating apparatus according to claim 18, wherein the inorganic binder comprises at least one of alumina sol, silica sol, titania sol, liquid glass, sepiolite, and attapulgite.

28. The exhaust gas treating apparatus according to claim 18, wherein the honeycomb unit further includes an inorganic fiber.

29. The exhaust gas treating apparatus according to claim 28, wherein the inorganic fiber comprises at least one of alumina, silica, silicon carbide, silica alumina, glass, potassium titanate, and aluminum borate.

30. The exhaust gas treating apparatus according to claim 28, wherein a content of the inorganic fiber is in a range of from about 3 wt % to about 50 wt %.

31. The exhaust gas treating apparatus according to claim 18, wherein the ammonia adsorbing material comprises zeolite ion-exchanged with Fe, Cu, Ni, Zn, Mn, or Co.

32. The exhaust gas treating apparatus according to claim 18, wherein a total amount of inorganic particles which are contained in the honeycomb unit and which include the NOx adsorbing material is in a range of from about 30 wt % to about 90 wt %.

33. The exhaust gas treating apparatus according to claim 18, wherein a solid content of the inorganic binder is in a range of from about 5 wt % to about 50 wt %.

34. The exhaust gas treating apparatus according to claim 18, comprising:
 plural pillar honeycomb units; and
 an adhesive layer which connects the honeycomb units.

35. The exhaust gas treating apparatus according to claim 18, comprising a single honeycomb unit.

* * * * *